3,376,276
LOW SHRINKAGE MODACRYLIC INTERPOLYMER
Ernest F. Stroh, Decatur, Ala., assignor to Monsanto Company, St. Louis, Mo., a corporation of Delaware
Filed Dec. 7, 1964, Ser. No. 416,317
8 Claims. (Cl. 260—80.73)

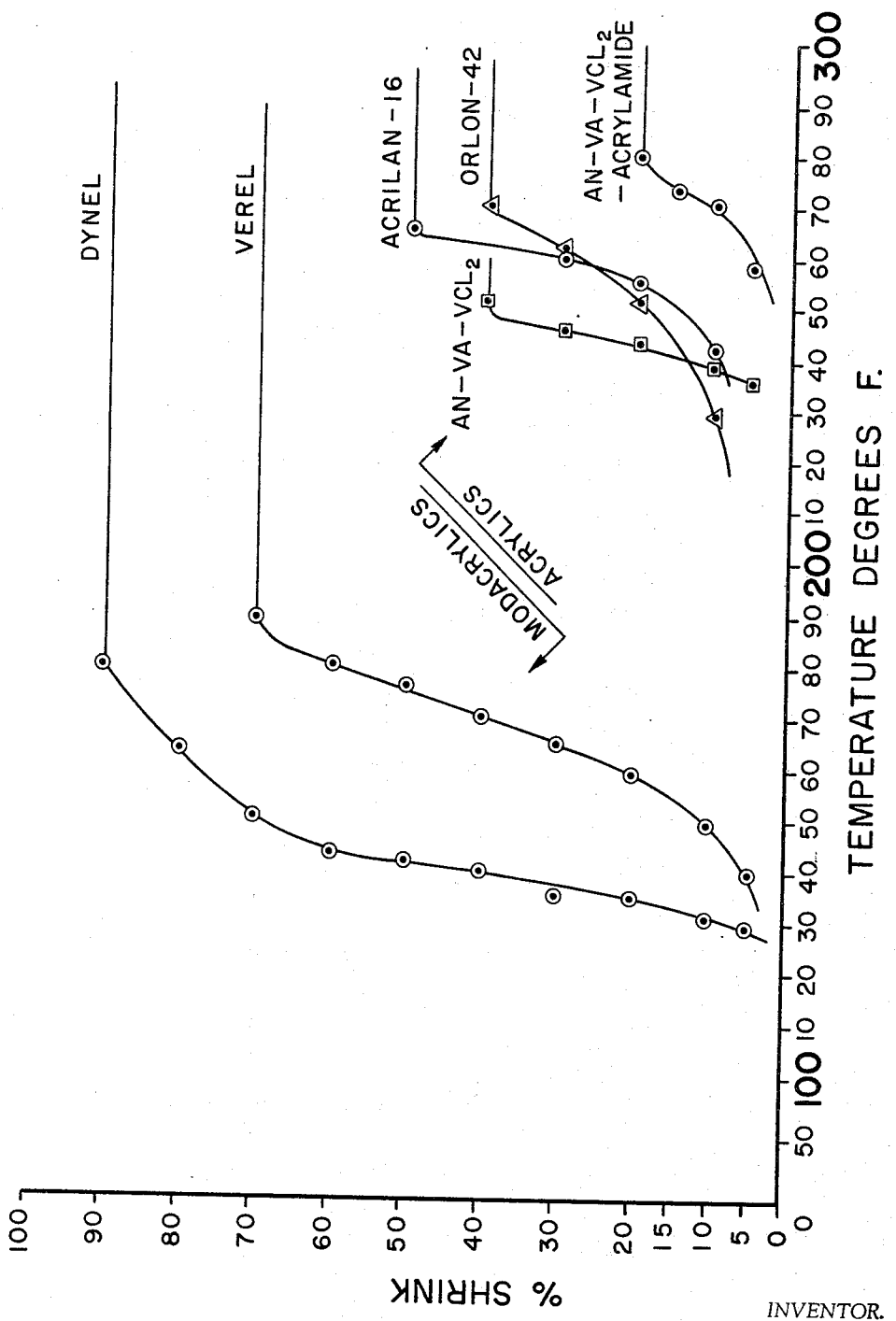

ABSTRACT OF THE DISCLOSURE

Dyeable flame-resistant polymers which are capable of being formed into fibers containing from about 3 to about 20 percent acrylamide, from about 60 to about 85 percent acrylonitrile, from about 5 to about 25 percent vinylidene chloride, and from about 3 to about 8 percent vinyl acetate.

---

According to the classification system for acrylonitrile containing polymers, those containing at least 85 percent acrylonitrile are classed as "acrylics," while those containing less than 85 percent are classed as "modacrylics." This differentiation is warranted by the different chemical and physical properties exhibited by polymers of each class. Two primary differences generally existing between the acrylics and modacrylics are acetone solubility and dry heat shrinkage. The modacrylics are soluble in ketone solvents while the acrylics are not, and the temperature required to produce a given amount of fiber shrinkage is in the order of 100° C. less for the modacrylics than for the acrylics.

These and other desirable properties of the acrylics make them more suitable for most textile applications than the modacrylics. The acrylics generally have a safe ironing temperature of about 100° C. higher than the modacrylics. The modacrylics, however, which may contain a relatively high percentage of halogenated monomers, are particularly suited for use where flame resistance is of prime consideration, such as in carpets, where it is common to blend modacrylics with acrylic fibers.

It is known that polyacrylonitrile fibers can also be made flame resistant to some extent by incorporating a halogenated monomer such as vinylidene chloride therewith. However, these polymers typically have poor dyeability as well as poor color and heat stability. The dyeability of the polymer may be improved by incorporating another vinyl monomer having side groups of high steric hindrance such as vinyl acetate, to form a flame resistant, dyeable terpolymer. A typical composition of this type is 85 percent acrylonitrile, 5 percent vinyl acetate, and 10 percent vinylidene chloride. However, the color and heat stability of this composition have been found to be poor, and the relatively low concentrations of vinyl acetate and vinylidene chloride provide only marginal dyeability and flame resistance.

A new modacrylic composition has now been discovered which has good dyeability and flame resistance, as well as good color, and surprisingly possesses such desirable properties attributed to acrylic compositions as acetone insolubility and low dry heat shrinkage at elevated temperatures. It has been found that the addition of a fourth monomer, acrylamide, to the acrylic terpolymer composition of acrylonitrile, vinyl acetate, and vinylidene chloride results in substantial and unexpected advantages in the properties of the fiber spun therefrom. This is indeed surprising since the acrylonitrile content of the fiber is reduced to less than 80 percent to accommodate the acrylamide, and heretofore, it has been generally supposed that such a reduction would result in the loss of desirable acrylic fiber properties. Furthermore, the vinylidene chloride content of the polymer can be increased to impart greater flame resistance to the fiber spun therefrom with no adverse effect on fiber properties.

An object of this invention is to provide a tetrapolymer which is both dyeable and flame resistant.

Another object of this invention is to provide a modacrylic tetrapolymer which has good color, receptivity to basic dyes, and flame resistance.

A further object of this invention is to provide a process for preparing synthetic fibers from a modacrylic tetrapolymer which possess physical and chemical properties at least equivalent to acrylic fibers.

These and other objects and advantages of this invention will be apparent to those skilled in the art from the following more detailed description which illustrates and discloses but is not intended to limit the scope of the invention.

FIGURE 1 illustrates the dry heat shrinkage characteristics of various commercial acrylic and modacrylic fibers as well as the novel fibers as herein disclosed.

Generally, the objects of this invention are accomplished by copolymerizing acrylamide with acrylonitrile, a halogenated monomer such as vinylidene chloride, and one other vinyl monomer having side groups of high steric hindrance such as vinyl acetate, to form a new tetrapolymer composition having new and unusual properties. More particularly, from 3 to 20 percent of acrylamide is copolymerized with 60 to 85 percent acrylonitrile, 5 to 25 percent vinylidene chloride, and from 3 to 8 percent vinyl acetate. The vinylidene chloride and vinyl acetate are incorporated in sufficient proportions to impart the desired degree of flame resistance and dyeability, respectively, to the fiber. The acrylamide is incorporated in sufficient proportions to further enhance the fiber dyeability, to improve the fiber color, and to impart to the fiber the desired physical properties normally associated with the acrylic class of fibers.

The dry heat shrinkage of fibers spun from this new tetrapolymer composition comprising 74 percent acrylonitrile, 15 percent vinylidene chloride, 5 percent vinyl acetate, and 6 percent acrylamide is graphically illustrated in FIGURE 1 as AN-VA-VCl$_2$-Acrylamide. The corresponding shrinkages of the following are also included in FIGURE 1 for comparison: Dynel, a modacrylic containing 60 percent acrylonitrile and 40 percent vinyl chloride manufactured by Union Carbide; Verel, a modacrylic containing 55 percent acrylonitrile, 25 percent vinylidene chloride and 20 percent N-ethyl acrylamide manufactured by Eastman; Acrilan–16, an acrylic containing 94 percent acrylonitrile and 6 percent vinyl acetate manufactured by Chemstrand; Orlon– 42, an acrylic containing 93 percent acrylonitrile and 7 percent methyl acrylate manufactured by Du Pont; and a noncommercial acrylic terpolymer containing 85 percent acrylonitrile, 5 percent vinyl acetate and 10 percent vinylidene chloride being identified as AN-VA-VCl$_2$.

It is obvious from FIGURE 1 that the modacrylic fiber of this invention has the dry heat shrinkage characteristics of acrylic fibers, and very much unlike the modacrylics of the known art. It is also surprising that the addition of the acrylamide to the acrylonitrile-vinyl acetate-vinylidene chloride terpolymeric composition decreases the dry heat shrinkage even though the proportion of acrylonitrile is substantially reduced.

Upon experimentation, it was found that the acrylamide and other monomers were compatible and polymerized according to theory. Any suitable polymerization process known in the art may be used, including emulsion, solution, and mass polymerization techniques. The preferred practice utilizes a semi-batch aqueous emulsion polymerization wherein the monomers and a part of the water containing the catalyst and activator are charged to the polymerization vessel, which has been precharged with the other part of the water. The reactants are charged over a finite period of time, and the polymer product is removed after the feeds have been exhausted and the reaction has progressed to the desired stage as determined by the molecular weight of the polymer chains.

Complete continuous polymerization can also be employed, in which the reactants are continuously fed to the reactor and the polymer product is simultaneously withdrawn over an indeterminate period of time. This method is generally preferred for large scale operations.

Fibers may be prepared from the tetrapolymer of this invention by either wet or dry spinning a solution of the polymer according to known techniques. In a preferred method, the polymer is dissolved in an organic solvent such as dimethylacetamide to form a viscous solution of 20 to 25 percent solids. The spinning solution is extruded through spinning jet into an aqueous coagulation bath containing about 50 percent solvent. The coagulated fibers are stretched about 5 times in a hot water bath which also serves to wash residual solvent from the fiber. A textile finish is then applied and the fibers are dried and crimped.

The following examples are cited to illustrate the invention and they are not intended to limit it in any way. Unless otherwise specified, all "parts" are expressed as parts by weight.

The polymerization is normally catalyzed by means of water-soluble salts of peroxy acids, sodium peroxide, hydrogen peroxide, sodium perborate, the sodium salts of other peroxy acids, and other water-soluble compounds containing the peroxy group:

(—O—O—)

A wide variation in the quantity of peroxy compound is possible. For example, from 0.1 to 3.0 percent by weight of the polymerizable monomer may be used. The so-called redox catalyst system also may be used. Redox agents are generally compounds in a lower valent state which are readily oxidized to the higher valent state under the conditions of reaction. Through the use of this reduction oxidation system, it is possible to obtain polymerization to a substantial extent at lower temperatures than otherwise would be required. This method is generally preferred where the monomers or ploymers involved tend to discolor at elevated temperatures. Suitable "redox" agents are sulfur dioxide, the alkali metal and ammonium bisulfites, and sodium formaldehyde sulfoxylate. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in regard to its chemical and physical properties.

Although the uniform distribution of the reactants throughout the reaction mass can be achieved by vigorous agitation, it is generally desirable to promote the uniform distribution of reagents by using inert wetting agents, or emulsion stabilizers. Suitable reagents for this purpose are the water-soluble salts of fatty acids, such as sodium oleate and potassium stearate, mixtures of water-soluble fatty acid salts, such as common soaps prepared by the saponification of animal and vegetable oils, the "amino soaps," such as salts of triethanolamine and dodecylmethylamine, salts of resin acids and mixtures thereof, the water-soluble salts of half esters of sulfonic acids and long chain aliphatic alcohols, sulfonated hydrocarbons, such as alkyl aryl sulfonates, and any other of a wide variety of wetting agents, which are in general organic compounds containing both hydrophobic and hydrophilic radicals. The quantity of emulsifying agent will depend upon the particular agent selected, the ratio of monomer to be used and the conditions of polymerization. In general, however, from 0.1 to 1.0 percent based on the weight of the monomers can be employed.

The emulsion polymerizations are preferably conducted in vessels provided with a water jacket to control the temperature of the reaction and means for agitating the contents therein. Generally, rotary stirring devices are the most effective means of insuring the intimate contact of the reagents, but other methods may be successfully employed, for example, by rocking or rotating the reactors. The polymerization equipment generally used is conventional in the art and the adaptation of a particular type of apparatus to be the reaction contemplated is within the province of one skilled in the art.

The optimum methods of polymerization for preparing fiber-forming acrylonitrile polymers involve the use of polymerization regulators to prevent the formation of polymer units of excessive molecular weight. Suitable regulators are the alkyl and aryl mercaptans, carbon tetrachloride, chloroform, dibutyltin oxide, antimony trioxide dithioglycidol and alcohols. The regulators may be used in amounts varying from 0.001 to 2 percent, based on the weight of the monomer to be polymerized.

The polymers from which the filaments are produced in accordance with the present invention have specific viscosities within the range of 0.10 to 0.40. The specific viscosity value, as employed herein, is represented by the formula:

$$N_{sp} = \frac{\text{Time of flow of polymer solutions in seconds}}{\text{Time of flow of the solvent in seconds}} - 1$$

Viscosity determination of the polymer solutions and solvent are made by allowing to flow by gravity at 25° C. through a capillary viscosity tube. In the determination herein, a polymer solution containing 0.1 gram of the polymer dissolved in 100 ml. of N,N-dimethylformamide was employed, also N,N-dimethylacetamide may be used. The most effective polymers for the preparation of filaments are those of uniform physical and chemical properties and of relatively high molecular weight.

The following examples are cited to illustrate the invention and they are not intended to limit the invention in any way. Unless otherwise noted "parts" are expressed in the examples indicate parts by weight.

Example I

The procedure of Example II was repeated with a monomer feed comprising a mixture of 79 percent acrylonitrile, 6 percent vinyl acetate, and 15 percent vinylidene chloride. Fiber spun from the polymer was evaluated and found to have the following properties:

Basic dye uptake _____ 3.2%.
Original color _____ 70 brightness, 9 purity.
Heated color _____ 68 brightness, 13 purity.
Maximum dry heat shrinkage _____ 50% at 251° C.
Denier _____ 20.8.
Tenacity _____ 1.3 g.p.d.
Elongation _____ 25%.

It is evident from the above data that the tetrapolymer of Example II, as compared to the terpolymer of Example I, has better basic dye uptake, better original and heated color, is more dimensionally heat stable, and has equivalent physical properties.

Example II

A 4 liter glass reactor equipped with internal baffles, an agitator, and a constant temperature water bath was charged with 900 gm. of deionized water. The temperature of the water was increased to 45° C., and the reactor feeds consisting of a monomer mix, a catalyst solution, and an actuator solution were started thereto. The monomer mix was fed to the reactor at a rate of 4.48 g./min., and was composed of 73.0 percent AN, 6.0 percent VA, 15.0 percent $VCl_2$, and 6 percent acrylamide. The catalyst solution was fed at a rate of 5.40 g./min. and was composed of a 0.294 percent aqueous solution of $K_2S_2O_8$. The activator solution was fed at a rate of 5.48 g./min. and was composed of 1.16 percent $SO_2$ and 0.122 p.p.m. $Fe^{++}$ (added as $FeSO_4 \cdot 7H_2O$) in deionized water.

Approximately 7 minutes after the start of the reactor feeds, the polymerization of the monomers had begun and polymer was visible in the reactor. The temperature of the exothermic polymerization reaction was maintained at about 51±1° C. by controlling the temperature of the surrounding water bath at 49–50° C.

After the reactor feeds were exhausted, the polymer slurry contents were heated to 90–95° C. to distill off and recover any unreacted monomers. The polymer product was then recovered by filtration and washed to remove impurities, dried and ground for use in fiber production.

The polymer was dissolved in dimethylacetamide to form a 22 percent solids solution, extruded through a spinning orifice into an aqueous coagulating bath containing 55 percent solvent at 50° C. The resulting filaments were washed, stretched, and dried. The fibers were evaluated and found to have the following properties:

| | |
|---|---|
| Basic dye uptake | 5.0%. |
| Original color | 80 brightness, 8 purity. |
| Heated color | 72 brightness, 13 purity. |
| Maximum dry heat shrinkage | 20% at 280° C. |
| Denier | 13.0. |
| Tenacity | 1.6 g.p.d. |
| Elongation | 28%. |

The basic dye acceptance was determined by applying a standard basic dyestuff, Sevron Blue 2G, to the fibers in a standard dye bath and determining the amount of dyestuffs fixed to the fibers.

EXAMPLE III

The process of Example I was repeated with a monomer feed to the polymerization reaction comprising a mixture of 65 percent acrylonitrile, 6.0 percent vinyl acetate, 15 percent vinylidene chloride, and 14 percent acrylamide. Fiber wet spun from the resulting polymer was evaluated and found to have the following properties:

| | |
|---|---|
| Basic dye uptake | 5.2%. |
| Original color | 83 brightness, 8 purity. |
| Heated color | 75 brightness, 12 purity. |
| Maximum dry heat shrinkage | 19% @ 284° C. |
| Denier | 18.2. |
| Tenacity | 1.5 g.p.d. |
| Elongation | 26%. |

It is to be understood to those skilled in the art that many apparently widely different embodiments of this invention can be made without departing from the spirit and scope thereof. Accordingly, it is to be understood that this invention is not to be limited to the specific embodiments thereof except as defined in the appended claims.

I claim:

1. A novel fiber-forming, flame resisting interpolymer having low dry heat shrinkage characteristics, said interpolymer being comprised of at least 60 percent by weight of acrylonitrile, at least 5 percent by weight of vinylidene chloride, at least 3 percent by weight of vinyl acetate and at least 3 percent by weight of acrylamide.

2. A novel fiber-forming, flame resisting interpolymer having low dry heat shrinkage characteristics, said interpolymer being comprised of from 60 percent to 85 percent by weight of acrylonitrile, from 3 percent to 20 percent by weight of acrylamide, from 5 percent to 25 percent by weight of vinylidene chloride, and from 3 percent to 8 percent by weight of vinyl acetate.

3. A novel fiber-forming, flame resisting interpolymer having low dry heat shrinkage characteristics, said interpolymer being comprised of approximately 73 percent by weight of acrylonitrile, 6 percent by weight of vinyl acetate, 15 percent by weight of vinylidene chloride, and 6 percent by weight of acrylamide.

4. A novel fiber-forming, flame resisting interpolymer having low dry heat shrinkage characteristics, said interpolymer being comprised of approximately 65 percent by weight of acrylonitrile, 6 percent by weight of vinyl acetate, 15 percent by weight of vinylidene chloride, and 14 percent by weight of acrylamide.

5. A textile fiber prepared from the polymer of claim 1.
6. A textile fiber prepared from the polymer of claim 2.
7. A textile fiber prepared from the polymer of claim 3.
8. A textile fiber prepared from the polymer of claim 4.

No references cited.

JOSEPH L. SCHOFER, *Primary Examiner.*

S. M. LEVIN, *Assistant Examiner.*